US008639771B2

(12) United States Patent
Manchester et al.

(10) Patent No.: US 8,639,771 B2
(45) Date of Patent: Jan. 28, 2014

(54) WINDOWS RALLY WIRELESS HID DEVICE

(75) Inventors: Scott Manchester, Redmond, WA (US);
Yasuhiro Odagiri, Saitama-ken (JP);
Takeshi Misu, Kanagawa (JP); Yusuke Jinnai, Kanagawa (JP); Keiichi Kishi, Tokyo (JP); Takeshi Nagao, Tokyo (JP);
David A. Roberts, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1179 days.

(21) Appl. No.: 11/534,376

(22) Filed: Sep. 22, 2006

(65) Prior Publication Data

US 2007/0271353 A1    Nov. 22, 2007

Related U.S. Application Data

(60) Provisional application No. 60/802,474, filed on May 21, 2006.

(51) Int. Cl.
*G06F 15/16* (2006.01)

(52) U.S. Cl.
USPC ............................. 709/217; 709/220; 713/200

(58) Field of Classification Search
USPC .................................. 709/217, 220; 713/200
See application file for complete search history.

(56) References Cited

U.S. PATENT DOCUMENTS

| 6,088,802 | A   | * | 7/2000  | Bialick et al. ................... 726/3 |
| 6,480,587 | B1  |   | 11/2002 | Rao et al.                               |
| 6,614,350 | B1  |   | 9/2003  | Lunsford et al.                          |
| 7,010,624 | B1  | * | 3/2006  | Zhou et al. ...................... 710/8 |
| 7,240,111 | B2  | * | 7/2007  | VanHarlingen et al. ...... 709/224       |
| 2002/0184526 | A1 |   | 12/2002 | Bender et al.                            |
| 2002/0199047 | A1 |   | 12/2002 | DuPont et al.                            |
| 2003/0045236 | A1 | * | 3/2003  | Chang et al. .................... 455/41 |
| 2003/0197488 | A1 |   | 10/2003 | Hulvey                                   |
| 2004/0177132 | A1 | * | 9/2004  | Zhang et al. .................. 709/220  |
| 2004/0203388 | A1 |   | 10/2004 | Henry et al.                             |
| 2005/0010655 | A1 |   | 1/2005  | Edwards et al.                           |
| 2005/0157668 | A1 | * | 7/2005  | Sivan ............................ 370/312 |
| 2005/0204026 | A1 | * | 9/2005  | Hoerl ........................... 709/223 |
| 2005/0289225 | A1 |   | 12/2005 | Zhuang et al.                            |
| 2006/0094461 | A1 |   | 5/2006  | Hameed et al.                            |

* cited by examiner

*Primary Examiner* — Jeffrey Pwu
*Assistant Examiner* — Samuel Ambaye
(74) *Attorney, Agent, or Firm* — Chin IP, PLLC; Davin Chin

(57) ABSTRACT

A system and method that identifies and effectuates communication between a connectable client and a wireless human interface device. The wireless human interface device utilizes technologies to abstract the complexities of IP based wired and wireless networks to provide mechanisms to easily discover, associate, utilize and diagnose the wireless human interface device. Through the ensuing abstraction the wireless human interface device can be associated with an unlimited number of connectable networked clients or hosts thus eliminating the requirement of analog switch boxes to connect human interface devices to each connectable host or client, and further providing for the control of local and/or Internet based hosts or clients.

16 Claims, 11 Drawing Sheets

WINDOWS RALLY WIRELESS HID DEVICE

CROSS-REFERENCE TO RELATED APPLICATIONS

This application claims the benefit of U.S. Provisional Application Ser. No. 60/802,474 filed on May 21, 2006, and entitled WINDOWS RALLY WIRELESS HID DEVICE. The entirety of the aforementioned application is incorporated herein by reference.

BACKGROUND

It is widely recognized that bus connected devices are constrained by cables and are forced to associate with a single host. In the past such constraints have been addressed through analog switching devices, for example, analog keyboard and mouse switch boxes. Nevertheless, such switching devices have limitations with respect to the matrix of hosts that can be supported and further create an exponential amount of cabling requirements.

Wireless technologies, such as Wi-Fi, have been put forth to break this reliance on cable connections, but such solutions, while mitigating the cable concerns, nevertheless impose a 1:1 association between the wireless device and the host. In other words, the wireless device can be associated with only a single PC at any given time.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The claimed subject matter relates generally to computer systems and, more particularly, to a new breed of wireless human interface devices (WHID) that employ technologies to abstract the complexities of IP based wireless networks, and to provide a mechanism to easily discover, associate, utilize, and diagnose a networked wireless human interface device.

The claimed subject matter replaces analog switching modalities, such as analog keyboard and mouse switch boxes, utilized by human interface devices (for example, keyboards, mice, speakers, monitors, microphones, Personal Digital Assistants (PDAs), tablets, joysticks, and the like) by virtualizing the human interface device as a service that resides on a client (e.g., a networked and/or a standalone computer/workstation). The physical human interface device functionality has been abstracted from the physical human interface entity and transferred into the functionality of a service resident on the client. Additionally, the complexities associated with IP based wireless networks have also been abstracted thus allowing deployment and utilization of IP based wireless human interface devices. Thus, by encapsulating the abstract functionality of the physical human interface device into a service resident on a networked client (e.g. a PC executing the TCP/IP stack) a physical human interface device, for example a keyboard, can be utilized with any number of networked clients that execute the service. For example, if there are four PCs in a data center, with the service of the claimed subject matter executing thereon, and one wireless IP keyboard, the wireless keyboard can be connected individually and/or simultaneously to each and every one of the four PCs without the need for a switching mechanism to direct keyboard communications to individual PCs. Thus, the 1:1 associative relationship between the human interface device and the computing means has been severed, while at the same time curtailing the cabling concerns between the human interface device and the computing means.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
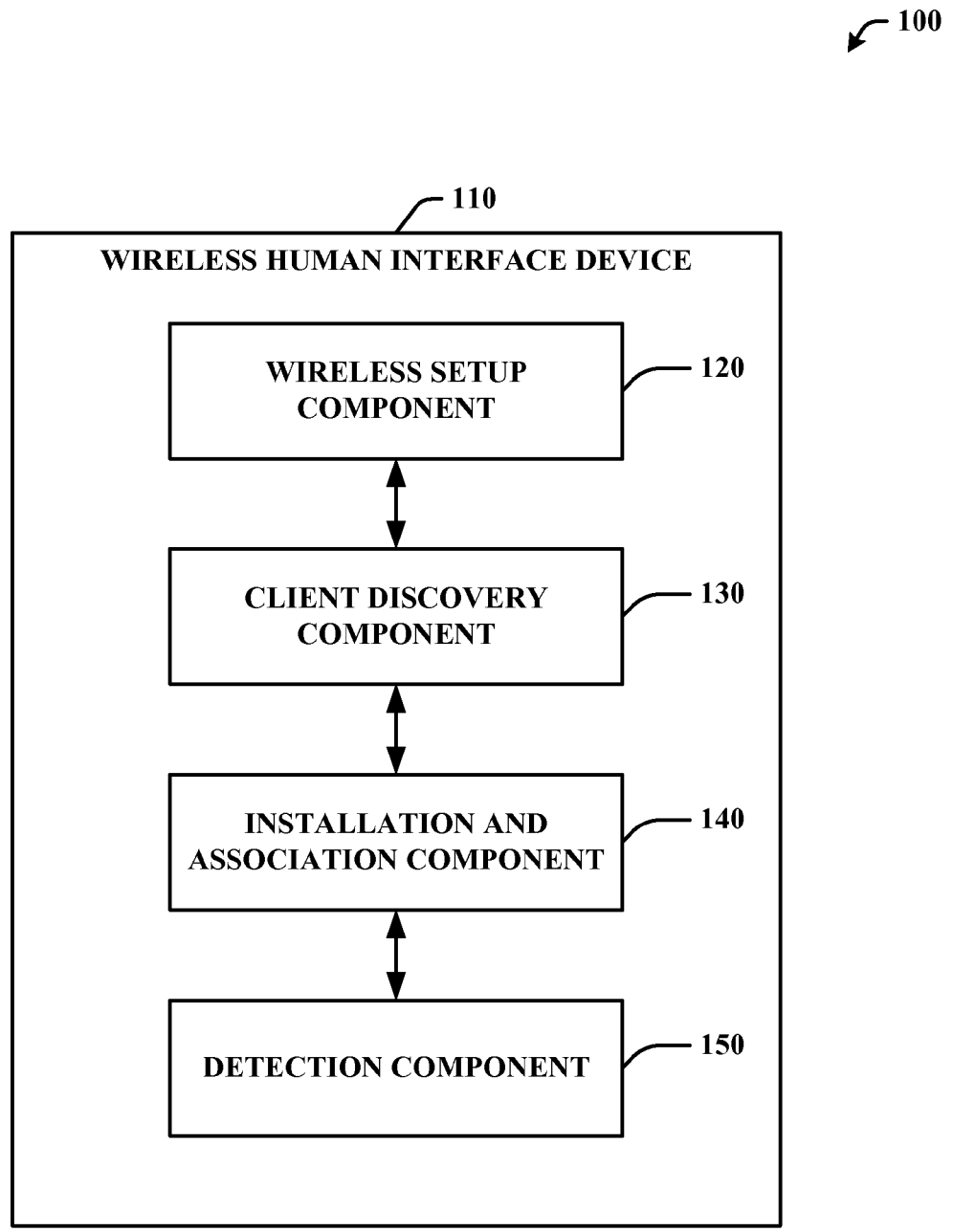
FIG. 1 is a block diagram of a wireless human interface device.

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

The wireless human interface device described herein can be associated with an unlimited number of networked hosts and/or clients and can thus eliminate the need for the traditional analog switchbox and further can provide the ability for local and internet based control of hosts and/or clients. The wireless human interface device can have a small LCD display that can be employed when the device is initially powered up to display an alphanumeric PIN number that can be used to configure the wireless settings and authenticate the device on the network. The alphanumeric PIN number can be utilized by a user who can proceed to any host or client. The user can be prompted, for example, via a graphical user interface, to enter the PIN number. Upon receipt of the PIN number the host or client can configure the wireless human interface device with a wireless profile and automatically associate the device with the host or client. The association includes driver installation and configuration of a secure channel for wireless communications between the wireless human interface device and the host or client. Establishment of such a secure channel can prevent sniffing of keyboard strokes, mouse command, etc.

Once the wireless human interface device has been associated with a host or client and the appropriate driver installed, the wireless human interface device can be used with the host or client. The user can at anytime invoke an action on the wireless human interface device to "map" the network to which the wireless human interface device is connected. Upon invocation of such an action the wireless human interface device can display, for example on the associated LCD, information about the device including the device's wireless signal strength, battery life, association history, current user, and the like. Where the wireless human interface device is not provisioned with an associated LCD, such information can be displayed on one or more host or client to which the wireless human interface device is paired.

Since the wireless human interface device can be simultaneously paired or associated with an unlimited number of hosts or clients, the LCD associated with the wireless human interface device can provide a list of nodes from which a user can select. Further, since host or client discovery can be effectuated using web services, hosts or clients to which the wireless human interface device can be associated or paired with can be located on both a local area network or across the vastness of the Internet. Thus, for example, a wireless human interface device can be located in New York and the paired hosts or clients can be located in San Francisco. The wireless human interface device, in this scenario, can control all the paired hosts or clients contemporaneously or individually.

The wireless human interface device described herein can thus be utilized in the following exemplary scenarios. For instance, the wireless human interface device can proxy standard bus attached devices to the host over a wireless channel to allow a hybrid configuration method. Thus, for example, a wireless keyboard can include a USB-A port to allow another human interface device (e.g., USB mouse) to be connected. The wireless human interface device, in this instance the wireless keyboard, can thus proxy the mouse over the wireless connection.

Further, the wireless human interface device can employ biometric technologies (e.g., thumbprints, retinal scans, . . . ) to authenticate a user to the wireless human interface device itself and/or to the host or client. Such biometric information can also be utilized during the authentication phase to provide secure pairing material. For example, at the initial pairing or association of a wireless human interface device and a host or client, a user can use a thumbprint reader associated with a wireless human interface device and then the user can proceed to the host or client and use a thumbprint reader associated with the client or host to pair the wireless human interface device and the host or client.

Additionally, the wireless human interface device can include a USB-B port to allow simultaneous bus connection that can be utilized to charge the battery of the device and to associate the device with the host or client. Furthermore, where a trust relationship exists between hosts or clients (e.g., a "Castle" or "Domain" relationship) a primary host can authenticate a wireless human interface device on behalf of a secondary host or client with which the primary host or client has a relationship. This facility can be useful where the secondary host is not easily accessible and therefore it would be difficult to undertake the authentication or pairing process directly with the wireless human interface device.

Where the wireless human interface device is not provided with an associated LCD display and the association or pairing of the wireless human interface device and a host or client has to be undertaken at the host or client end, a key sequence (e.g., <CNTRL>, <SHFT>, <?>) or an action key on the keyboard of the host or client can be pressed. Pressing the action key or key sequence can cause a display associated with the host or client to display a number that can be used by the user to enter this number on the wireless human interface device to associate the wireless human interface device and the identified host or client.

In addition, the wireless human interface device can be used in conference room settings where a conference computer can be designated as a host whereupon any member of the meeting can associate with the conference room computer and effectively take control of a presentation or other collaborative effort from his/her personal laptop, for example. In essence, an attendee's personal laptop becomes the wireless human interface device that can be associated with the conference room computer thus allowing the attendee to control the conference room computer without the necessity of having to physically access the conference room computer.

Moreover, a wireless human interface device with an associated LCD display and memory, such as, for example, a thin word processor, can be employed in a manner that allows text and images to be input into the associated memory of the wireless human interface device. Thus, for example a user can utilize the wireless human interface device to access a first computer to access and copy data into the memory of the wireless human interface device. The user can then access a second computer and paste the copied data into an application running on the second computer.

Alternatively, where the wireless human interface is not provisioned with an associated memory, the user can access and copy data into a buffer (e.g. memory) on a first computing device, switch to a second computing device, and paste the copied data that is stored in the buffer of the first computing device into an application executing on the second computing device. In this instance the wireless human interface device acts as a proxy service for the first and second computing devices.

FIG. 1 illustrates a wireless human interface device 110 that comprises a wireless setup component 120 that discovers and establishes wireless communications between two end points, a client discovery component 130 that receives information regarding clients to which the wireless human interface device can establish communications with, an installation and association component 140 that installs and configures associated drivers and software necessary for appropriate for communication with a client as well as for the functioning of the wireless human interface device 110, and a detection component 150 that detects how the human interface device 110 is connected to the network, for example via the device's wireless signal strength.

The wireless setup component 120 can be a service that continuously executes on the wireless human interface device 110. The wireless human interface device 110 can include such devices as a keyboard, mouse, speakers, microphone, tablets, joysticks, for example. The wireless setup component 120 can discover the existence of clients to which the wireless human interface device 110 is capable of attaching to, or pairing with. The wireless setup component 120 can continuously listen or monitor for signals emitted by clients that are within the wireless range of the device 110. When the wireless setup component 120 determines the existence of a client within the wireless range of the device 110, the setup component 120 can broadcast pertinent information about itself, such as, for example, what type of device it is (e.g., keyboard, mouse, joystick, tablet, speakers, microphone), the kind(s) of interfaces it has, and its media access control address (MAC address).

The client discovery component 130 can be another service resident on the human interface device 110 that continuously listens for information regarding prospective clients to which the wireless human interface device 110 can pair with. The client discovery component 130 receives information that can be sent or transmitted from the prospective client, such information can include what type of device the client is, for example a standalone and/or networked PC and/or workstation, the client's MAC address, the types of interfaces that may be extant on the PC and/or workstation, etc. Additionally, the client discovery component 130 can receive information necessary to effectuate association or pairing of the human interface device 110 and the prospective client, such information can include, for example, a unique PIN number that can be employed during the pairing process between the human interface device 110 and the prospective client.

The installation and association component 140 can employ the authentication information that can be transmitted from a prospective client in order to receive drivers and application software delivered from the prospective client. These drivers and application software can be installed on the wireless human interface device 110 by the installation and association component 140 to effectuate the full functionality of the wireless human interface device 110.

The detection component 150 detects how the wireless human interface device 110 is connected to the network and ascertains the device's signal strength. For example, if a wireless keyboard is outside the range of a wireless access point the performance of the keyboard starts to degrade, e.g., the keystrokes from the wireless keyboard are not recognized by the client, in which case the detection component 150 can ascertain that the cause for the degradation in service is due to the fact that the wireless signal strength was poor. Thus, in the aforementioned example, the detection component 150 can inform the client that the reason for the degradation in performance was due to the fact that the signal strength was poor. The benefit of such a feature is that typically, human interface devices, such as keyboards, mice, joysticks, and the like, are not provided with a user interface, and as a consequence there commonly is no means to indicate the cause of the degradation either to the user of the wireless human interface device 110 or to the client to which the device 110 is paired with.

Figure 2:
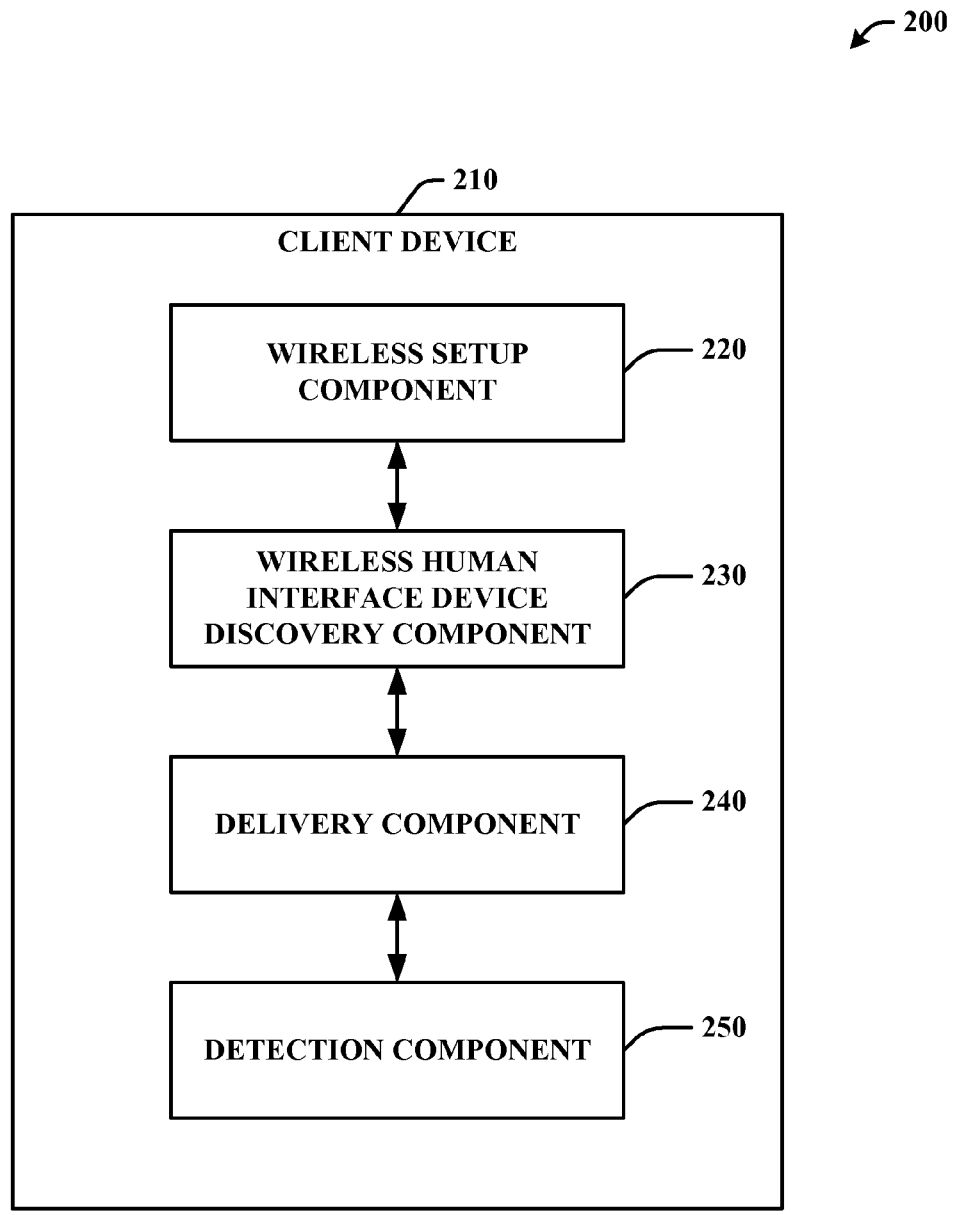
FIG. 2 illustrates a client device that discovers and establishes wireless communications between the wireless human interface device and the client device.

FIG. 2 illustrates an client device 210, such as a networked PC and/or workstation that comprises a wireless setup component 220 that discovers and establishes wireless communications between two endpoints, a wireless human interface device discovery component 230, a delivery component 240 that locates appropriate drivers and application software necessary to effectuate both the functionality of a wireless human interface device and communications between the client device and the wireless human interface device, and a detection component 250 that detects how the client device 210 is connected to the network.

The wireless setup component 220 can be a service that executes on the client device 210. The wireless setup component 210 can discover the existence of multiple wireless human interface devices, such as keyboards, mice, microphones, speakers, personal digital assistants (PDAs), to which the client 210 can be paired. The wireless setup component 220 can also be employed to discover the existence of other client devices that are also communicating wirelessly. The wireless setup component 220 can continuously monitor for signals emitted by both wireless human interface devices as well as for signals transmitted by other wirelessly connectable devices. Thus, when the wireless setup component 220 discerns the existence of a wireless human interface device, or for that matter any other wirelessly connectable devices, within its vicinity, the wireless setup component 220 can broadcast pertinent information about itself to the detected wireless human interface device. Such information can include, for example, the type of client device that it is, the kind of interfaces that are available for use by the detected human interface device, and the like. In addition, the wireless setup component 220 can transmit authentication, connection (e.g., secure channel to broadcast on) and protocol information to the wireless human interface device that can in turn be used by the wireless human interface device so that the client device 210 and the wireless human interface device can establish wireless communications between one another.

The wireless human interface device discovery component 230 can be another service effectuated on the client device 210. The wireless human interface device discovery component 230 can continually listen for information that is transmitted by a prospective wireless human interface device to which the client device 210 can be associated. The wireless human interface device discovery component 230 can receive information that is transmitted from a prospective wireless human interface device. Such information can include, for example, the type of device that the wireless human interface device holds itself out to be (e.g., mouse keyboard, tablet, joystick, speakers, microphone . . . ), the MAC address associated with the wireless human interface device, the types of interfaces that are available and the current usage of such interfaces, etc. Further, the wireless human interface device discovery component 230 can receive authentication information transmitted from the wireless human interface device, such as a PIN number or biometric information that can be utilized during the pairing process between the client device 210 and the wireless human interface device. Additionally, wireless human interface device discovery component 230 upon receipt of pertinent data/information (e.g., device type, interface type(s), and the like) from the prospective wireless human interface device can automatically marshal appropriate software, such as for example, drivers, firmware updates, and application software, etc. for subsequent dissemination and installation on the wireless human interface device. Furthermore, wireless human interface device discovery component 230 based at least in part on data/information received from the prospective wireless human interface device can dynamically effectuate installation of appropriate correlative software (e.g., firmware updates, drivers, . . . ) on the client necessary to support the detected wireless human interface device. It should be noted that both the correlative software and software marshaled for subsequent dissemination can be obtained from one or more sources both internal and/or external to the client, such as for example, local cache, CD/DVD, Internet server, and the like.

The delivery component 240 can, once communications have been established between the client device 210 and the wireless human interface device, utilize information gleaned from the wireless setup component 220 and wireless human interface device discovery component 230 to deliver drivers and associated application software to the wireless human interface device. A human interface device to can thus utilize these drivers and associated software both to effectuate communication with the client device 210 as well as to establish the full functionality of the wireless human interface device with the client device 210.

The detection component 250 detects how the client device 210 is connected to the network and ascertains health aspects (e.g., diagnoses) related to the established connection between the client device 210 and the wireless human interface component. The detection component 250, for example, can ascertain the reasons for degradation of services between the client device 210 and the wireless human interface device. Further the detection component 250 can also provide indications as to the battery life of the wireless human interface device, indications as to the current association between the client device 210 and one or more associated human interface devices, the current user using the wireless human interface device, and the current users utilizing all other wireless human interface devices, as well as other disparate client devices that have been associated with the client device 210.

Figure 3:
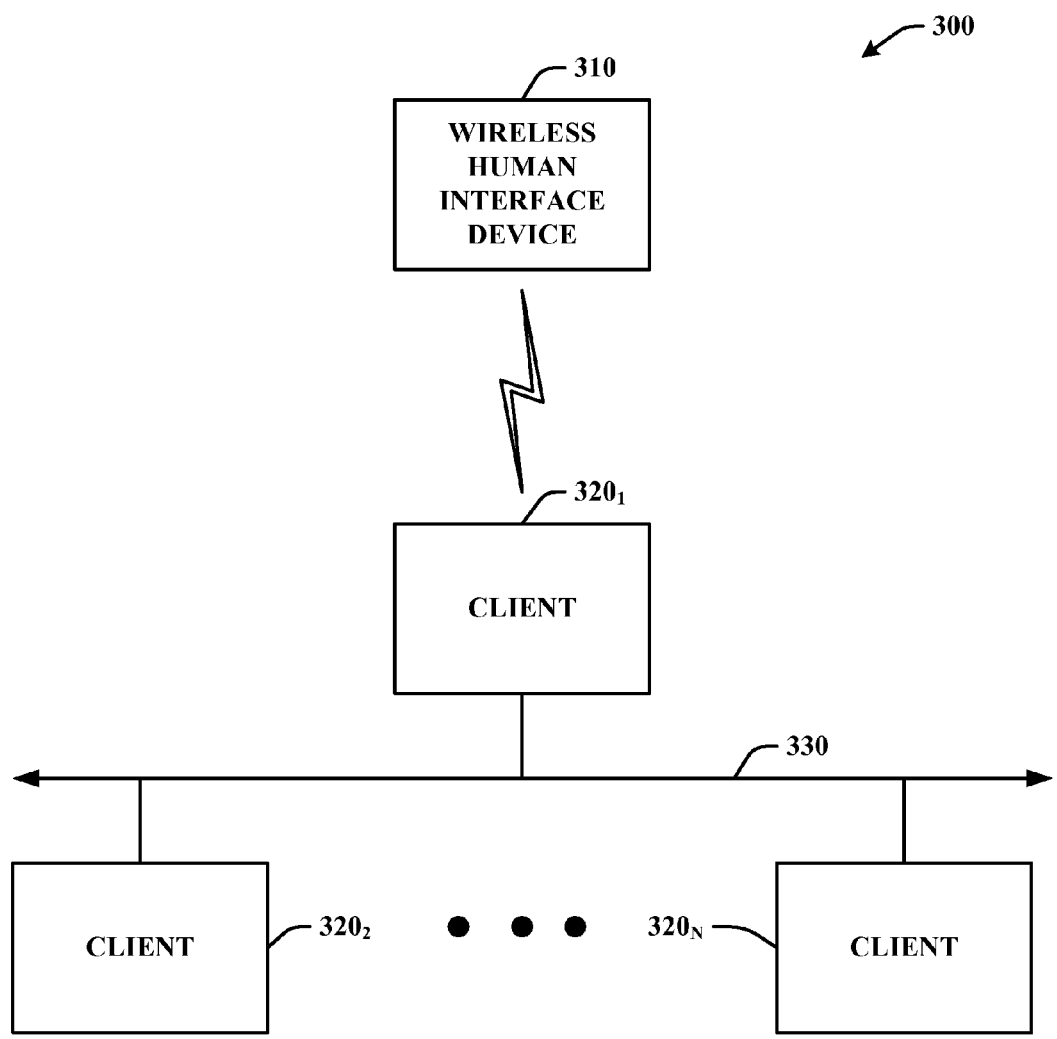
FIG. 3 is a block diagram of an exemplary system that employs a wireless human interface device to wirelessly communicate with multiple networked clients.

FIG. 3 depicts a system 300 that includes a wireless human interface device 310 (e.g., a mouse, keyboard, joystick, microphone, tablet, . . . ) in wireless communication with a client $320_1$. System 300 can further include clients $320_2$ . . . $320_N$, wherein clients $320_1, 320_2, \ldots 320_N$ are networked to one another through one or more network medium 330 running one or more network protocols, for example TCP/IP. The wireless human interface device 310, as mentioned supra, can be in wireless communications with client $320_1$, and thus the wireless human interface device 310 can effect control over processes running on client $320_1$. Additionally, if a trust relationship exists between clients $320_1, 320_2, \ldots 320_N$, for example a "domain" relationship, client $320_1$ can associate the wireless human interface device 310 with each and every client $320_2, \ldots 320_N$ such that the wireless human interface device 310 can control processes on clients $320_2, \ldots 320_N$, individually and/or collectively, without device 310 necessarily being in direct communication with nodes $320_2, \ldots 320_N$.

Figure 4:
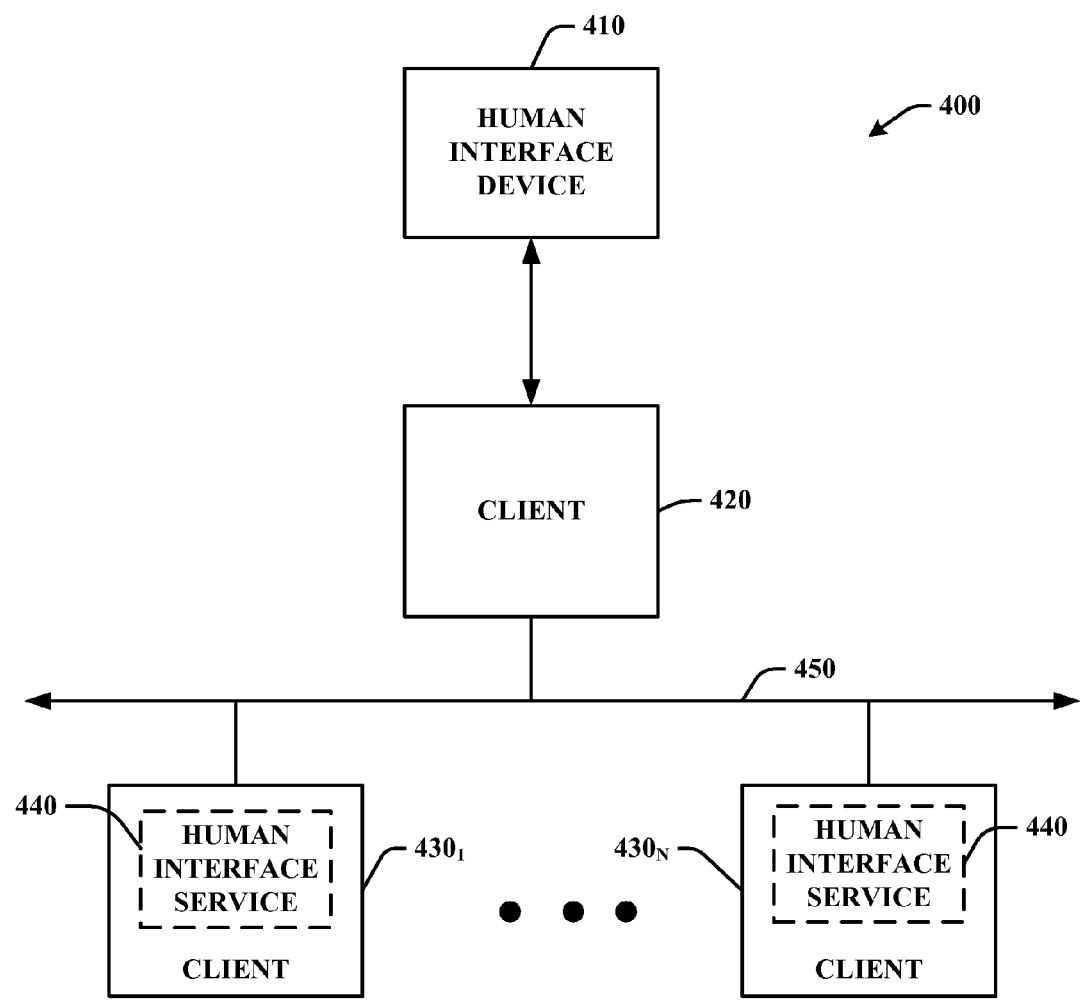
FIG. 4 is a block diagram of a human interface device in direct communication with a client and in indirect communication with a plurality of networked clients.

FIG. 4 illustrates a system 400 that includes a human interface device 410 (e.g. keyboard, mouse, etc.) that is directly connected to client 420. System 400 further includes clients $430_1, \ldots 430_N$, wherein clients 420 and $430_1, \ldots 430_N$ are networked to one another through one more network medium 450 and employing one or more networking protocol. Additionally, each client $430_1, \ldots 430_N$ has executing thereupon a human interface service 440 that provides an abstraction of the functionality of one or more human interface devices, for example, tablets, speakers, joysticks, mice and keyboards.

Human interface device 410 being directly connected (e.g., via USB port, parallel port, serial port) can effect control over client 420 and any applications executing on client 420. Further, where a trust relationship exists between the various nodes (e.g., 420, $430_1, \ldots 430_N$) the human interface device 410 can effect control of processes on clients $430_1, \ldots 430_N$ through the human interface service 440 resident on nodes $430_1, \ldots 430_N$.

Figure 5:
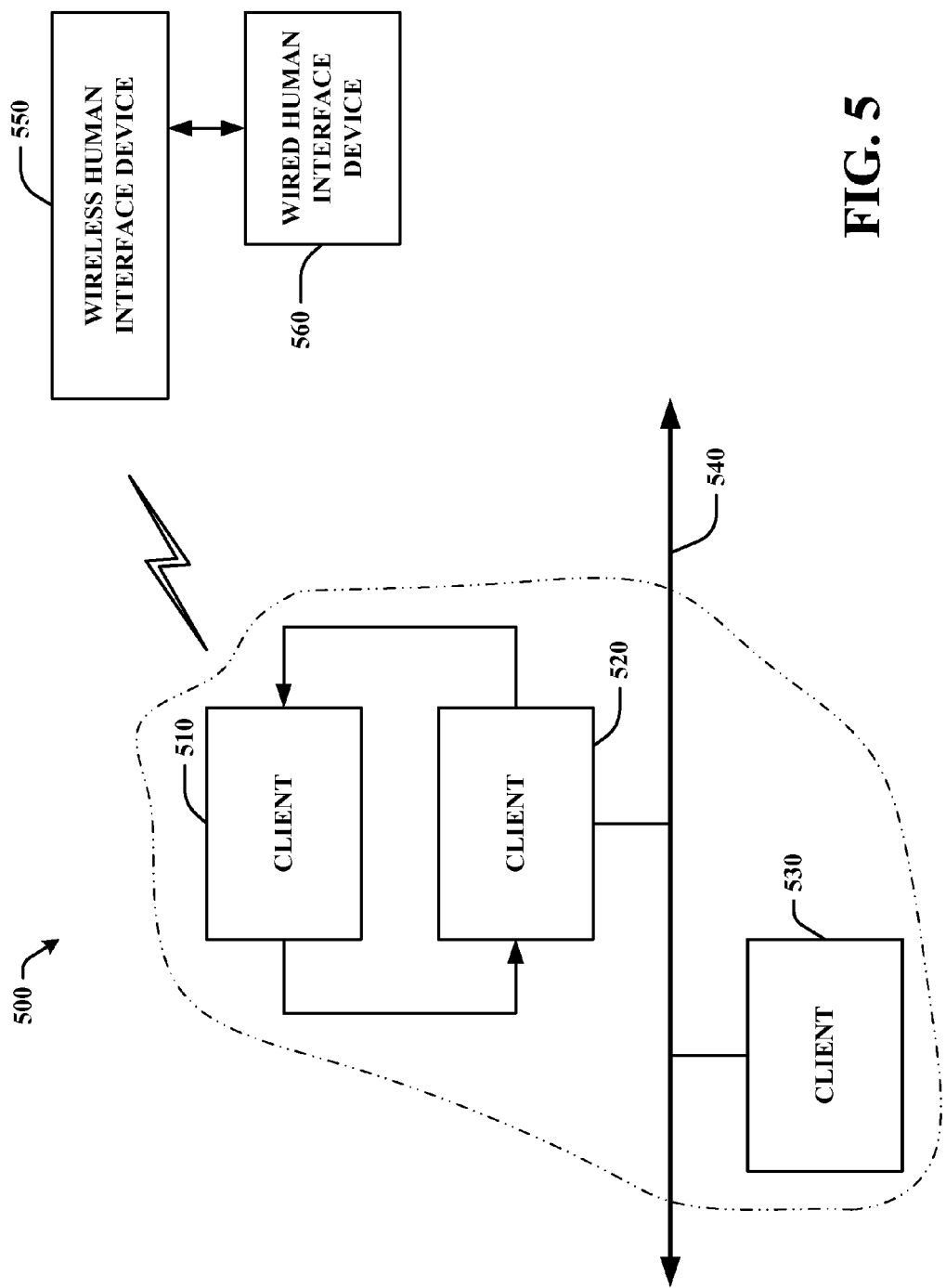
FIG. 5 is a block diagram that illustrates a system that employs a wireless human interface device and an associated wired human interface device to wireless communicate with one or more networked clients that form a trusted relationship with one another.

FIG. 5 depicts a system 500 that includes client 510, client 520 and client 530 that are in a trust relationship (e.g., "castle" or "domain") with one another (indicated by the dashed line surrounding clients 510-530), wherein clients 520 and 530 are members of a network topology 540, and clients 510 and 520 have a local communicative relationship with one another, and each of the clients 510-530 has executing thereupon a human interface service (not shown) that provides an abstraction of the functionality of one or more human interface devices, such as, for example, mice, keyboards, tablets, joysticks, and the like. For instance, clients 520 and 530 can be connected via Gigabit Ethernet, and clients 510 and 520 can be connected to one another through a dedicated link. Additionally, system 500 also includes a wireless human interface device 550 (e.g., wireless keyboard) that is in wireless communication with client 510 and further is coupled to a wired human interface device 560 (e.g., mouse, trackball, joystick, tablet, . . . ) via a USB-A port, for example. The wireless human interface device 550 can thus at the time of initial setup disclose and broadcast information about itself as well as information about the wired interface device 560 that is associated with the wireless human interface device 550. Once the wireless human interface device 550 has identified a suitable and responsive client to pair with (e.g., client 510) the wireless human interface device can receive or mine for information about the prospective client. The wireless human interface device 550 can at this juncture also receive authentication information from the prospective client that can be employed to effectuate the subsequent pairing and communications between the wireless human interface device 550 and the prospective client, as well as receive drivers and any associated software necessary to ensure that the wireless human interface device 550 as well as the wired human interface device 560 can effectuate appropriate control and functionality over the client. In this situation, the wireless human interface device 550 acts as a proxy for the wired human interface device 560, receiving the drivers and software, if any, and effectuating communications with the client, necessary to allow the wired human interface device 560 to manifest appropriate control over the client. Once the wireless human interface device 550 and the wired human interface device 560 have been appropriately with provisioned with authentication information necessary to facilitate pairing and communications between the wireless human interface device 550 and the client (e.g., client 510), as well as the appropriate drivers and software need to exert appropriate control over the client, the wireless human interface device 550 and the wired human interface device 560 can utilize the trust relationship that exists to effectuate control over clients 510-530.

Figure 6:
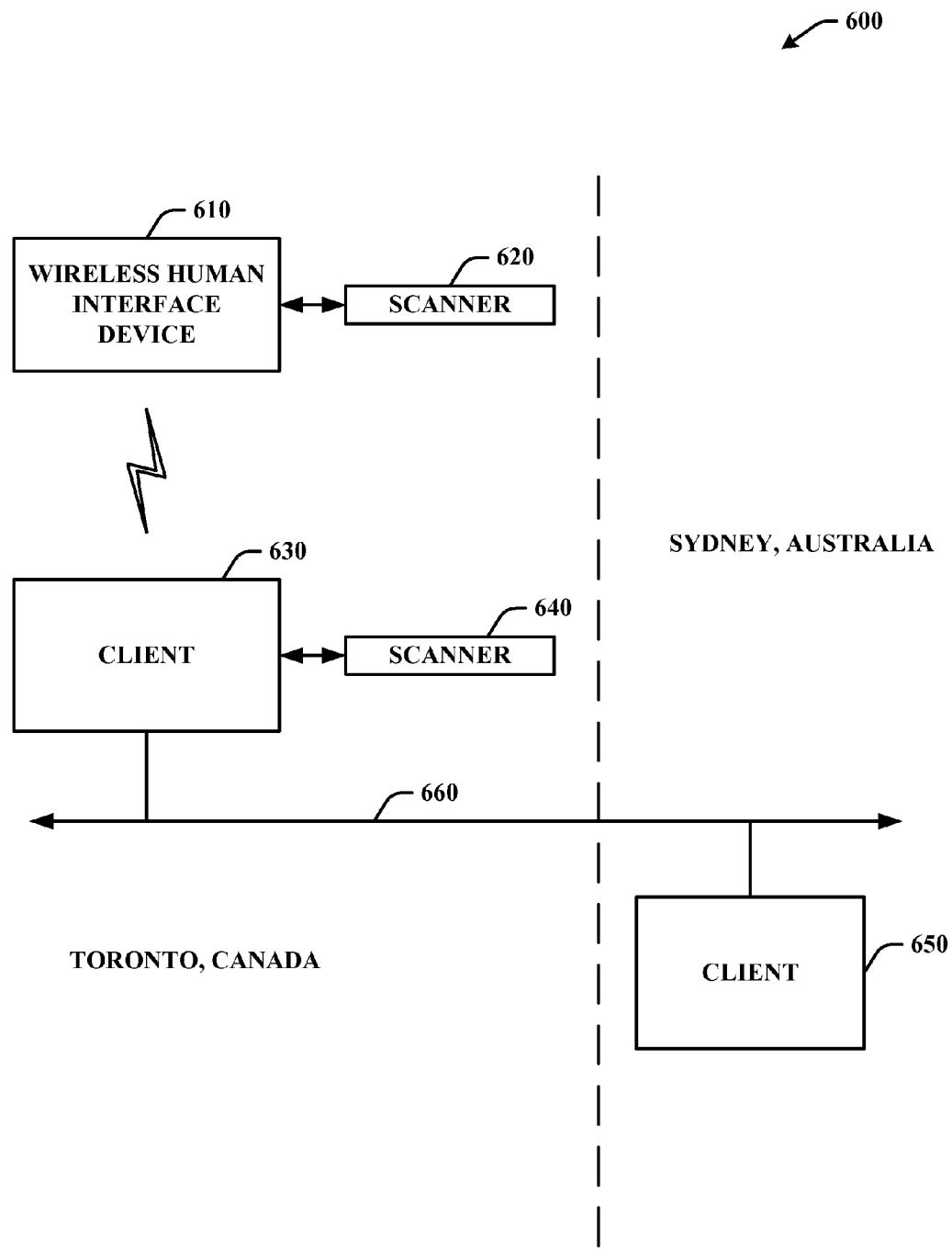
FIG. 6 is a block diagram that depicts a system that utilizes a wireless human interface device and an associated scanner to supply pairing information to establish wireless communications and thereafter control by the wireless human interface device over a set of clients that have entered a trust relationship with one another.

FIG. 6 illustrates a system 600 that includes a wireless human interface device 610 and an associated biometric scanner 620 that is in wireless communication with client 630 and an associated biometric scanner 640. Additionally, wireless human interface device 610 and its associated biometric scanner 620 and client 630 and its associated biometric scanner 640 are physically located, for example, in Toronto, Canada. Further as depicted in FIG. 6, system 600 also includes client 650, located, for instance, in Sydney, Australia, that is in operative communication with client 630 via network topology 660. As has been described supra, the wireless human interface device 610 can broadcast information associated with itself for possible reception by a client (e.g. client 630). Once the wireless human interface device 610 has located a suitable client to pair with the wireless human interface device 610 can receive and/or gather information about the prospective client. The wireless human interface device 610 can at this point request a user of the wireless human interface device 610 to supply biometric information via the scanner 620. Such biometric information can include thumbprints, retinal images, etc., scanned directly by the scanner 620 from the user, or the biometric information can be supplied by a smartcard that has pertinent biometric information embedded therein. The biometric information gleaned by the scanner can thereafter be utilized as pairing information and for authentication for subsequent communication between the client and the wireless human interface device 610 and one or more client. Simultaneously and/or contemporaneously, while the wireless human interface device 610 is obtaining pertinent biometric information from its associated scanner 620, the client (e.g., client 630) can supply appropriate drivers and software to the wireless human interface device 610 to allow control of one or more clients (e.g., clients 630 and 650). Once the appropriate information (e.g., drivers, software, biometric information, and the like) has been provisioned to the wireless human interface device 610, the client (e.g. client 630) in communication with the wireless human interface device 610 can request that the user of the wireless human interface device 610 provide corroborating biometric paring information via an associated scanner 640. Thereafter, once the wireless human interface device 610 has been appropriately and securely paired with the client (e.g., client 630), the wireless human interface device 610 can effectuate control over the client. Additionally, if the paired client is, or subsequently becomes, a member of a trust relationship (e.g., castle, domain, and the like) then the wireless human interface device 610 can be utilized in combination with all clients that form the trust relationship. Thus, where this is the case, and as illustrated in FIG. 6, a wireless human interface device 610, located in Toronto, Canada, can operatively control client 650 located in Sydney, Australia, via client 630 located also located in Toronto, Canada, provided that there exists some form of trust relationship between client 630 and client 650 located in disparate parts of the world.

Figure 7:
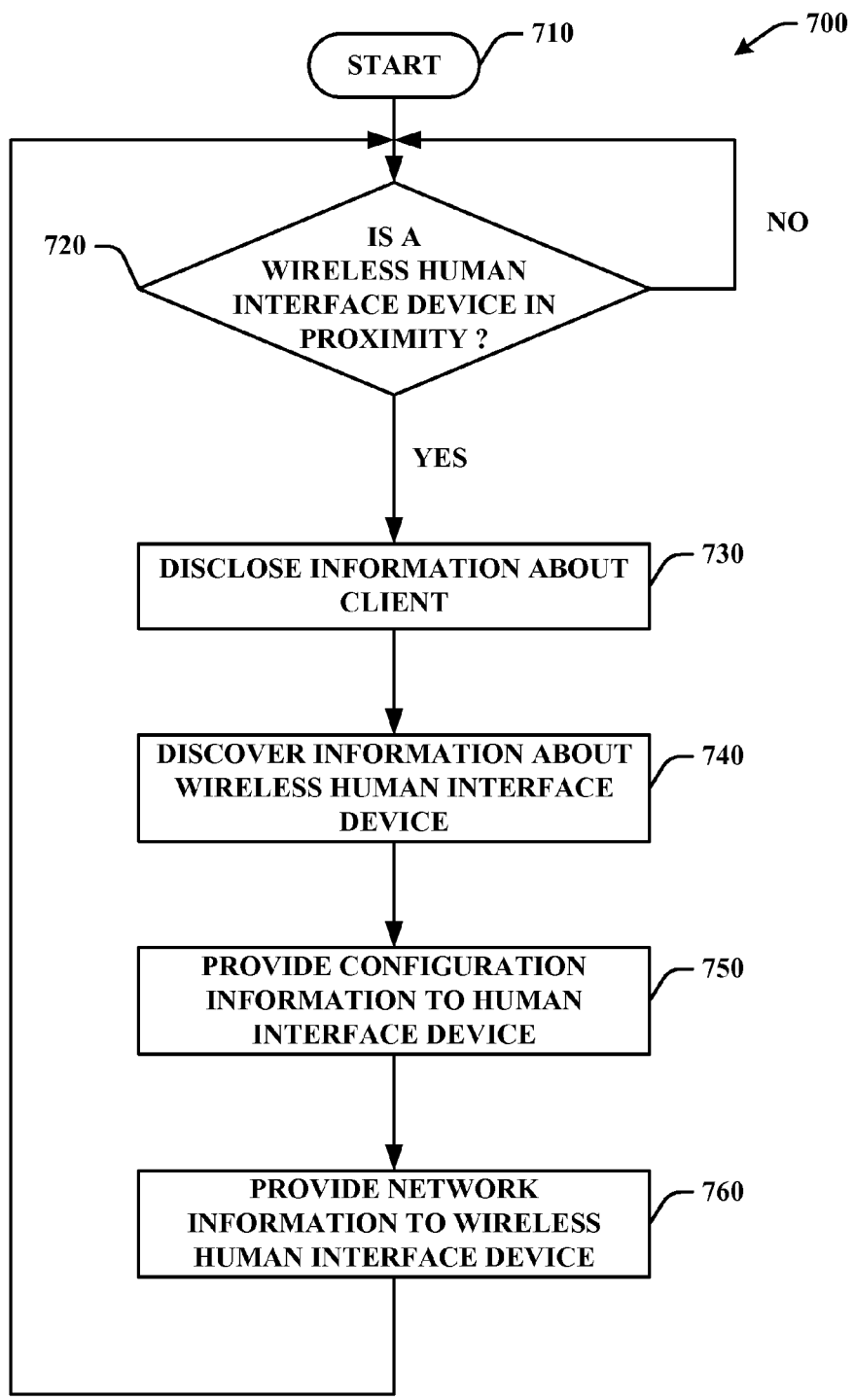
FIG. 7 is a flowchart diagram of a method that can be employed by a client component of the subject invention to detect and configure a wireless human interface component.
Figure 8:
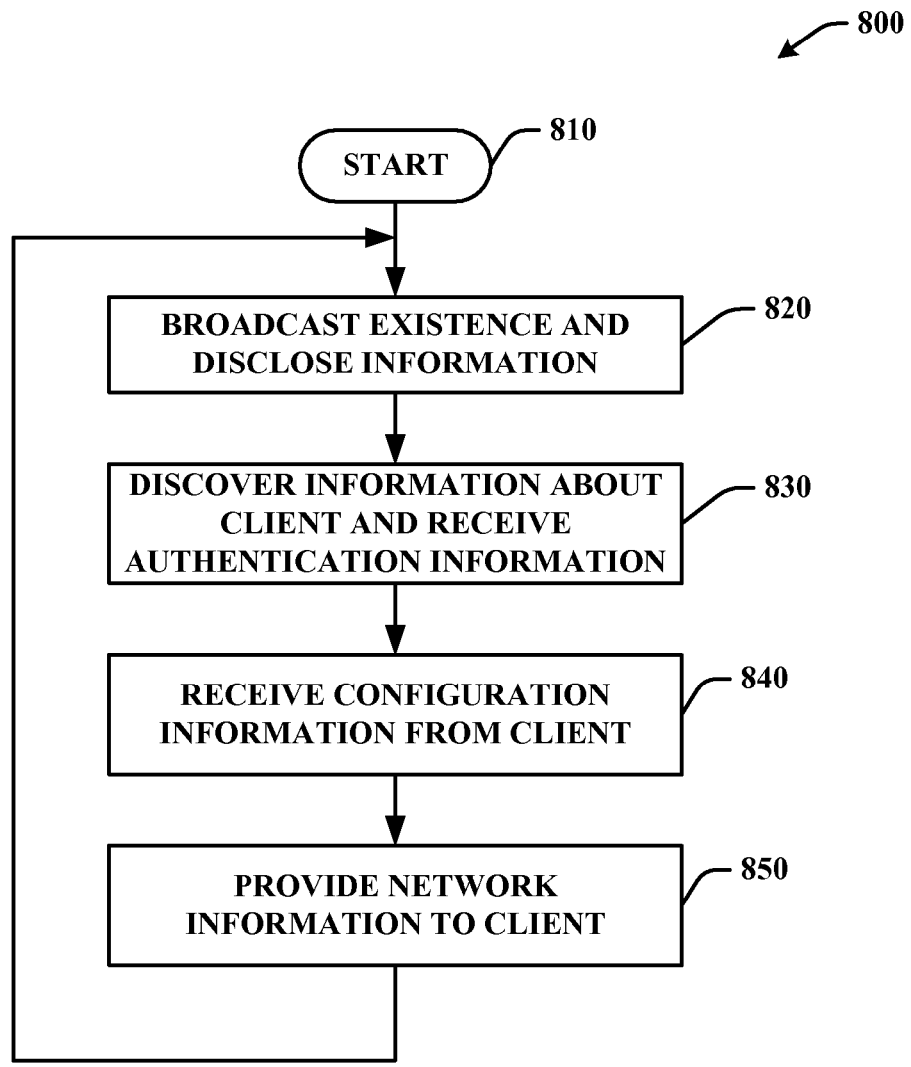
FIG. 8 is a flowchart diagram of a method that can be utilized by a wireless human interface component to detect the existence of a client component and to receive configuration information from the client component.

In view of the exemplary systems described supra, methodologies that may be implemented in accordance with the disclosed subject matter will be better appreciated with reference to the flow charts of FIGS. 7-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

FIG. 7 represents an exemplary method 700 for detecting and configuring a wireless human interface device. The method 700 can be executed on a client device. The method commences at 710 and immediately proceeds to 720 where a client device waits to detect whether a wireless human interface device is in the proximity of the client device. When no wireless human interface devices are detectable the method loops to the commencement of the methodology 700. Where a wireless human interface device is determined to be in the proximity of the client device, the method proceeds to 730 whereupon information about the client executing the exemplary methodology 700 can be broadcast. The method then proceeds to 740 whereupon the client receives information regarding the wireless human interface device that has entered the proximate range of the client device. Upon receipt of the discovery material at 740, the method proceeds to 750 where the client can provide configuration information to the wireless human interface device. Once the configuration information has been supplied to the wireless human interface device at 750, the method moves to 760 where the client can send network information to the wireless human interface device.

FIG. 8 illustrates an exemplary method 800 for detecting and configuring a wireless human interface device. The method 800 commences at 810 and immediately proceeds to 820 where the wireless human interface device executing the method 800 broadcasts and discloses information about itself. The method then proceeds to 830 where the wireless human interface device having identified a responsive client to pair with receives or discovers information about the prospective client and also receives any authentication information that the client may supply to effectuate subsequent pairing between the wireless human interface device and the client. The method then proceeds to 840 where the wireless human interface device receives configuration information from the client. Such configuration information can include drivers and any associated software necessary to ensure that the wireless human interface device can effectuate appropriate control over the client. The method then proceeds to 850 where the wireless human interface device can provide network information to the client. It should be noted that the wireless human interface device can not only supply network information to the client, but can also supply additional pertinent information, such as indications regarding battery life, association history, and information about the current user (e.g., biometric information).

Figure 9:
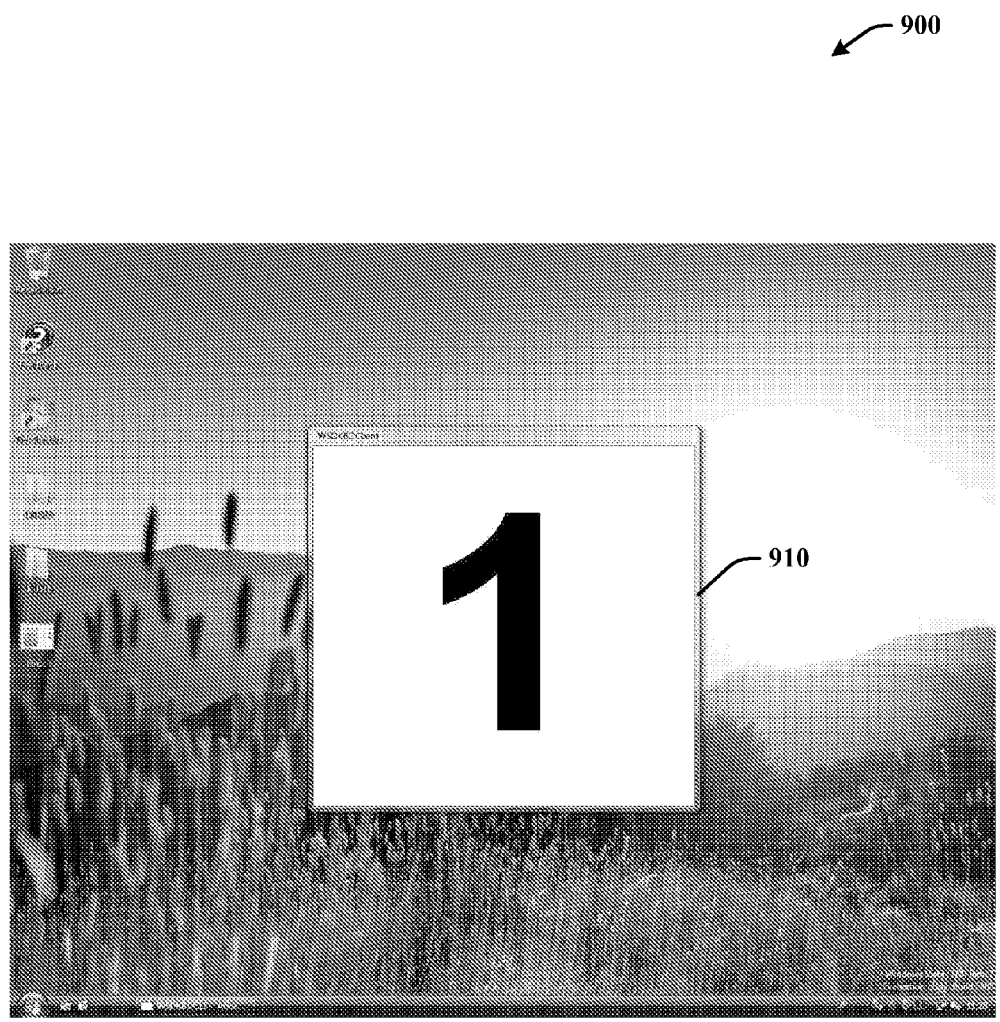
FIG. 9 is an illustrative screenshot that depicts the result of entering a unique key sequence into a host or client workstation.

FIG. 9 is an illustrative screenshot 900 that depicts the result of entering a unique key sequence (e.g., <CNTRL>, <ALT>, <@>) or holding down an assigned action key on the host or client. As is illustrated a box 910 is displayed on the monitor of the workstation, this display 910 can gradually fade into the background over a predetermined length of time. The box 910 contains a number that can be used by a user to enter such number on the wireless human interface device to associate the wireless human interface device with the identified host or computer.

Figure 10:
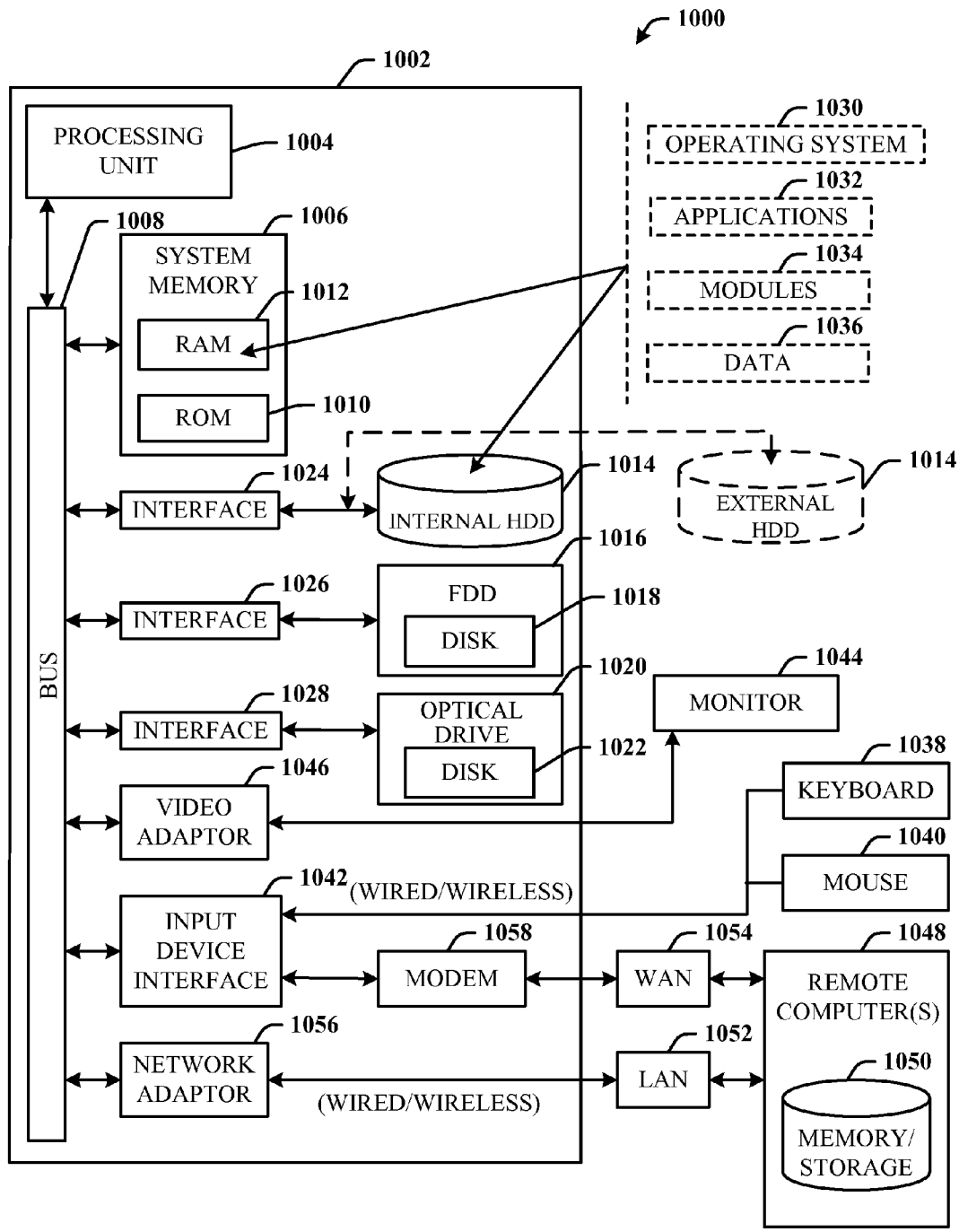
FIG. 10 is a schematic block diagram illustrating a suitable operating environment for aspects of the subject innovation.
Figure 11:
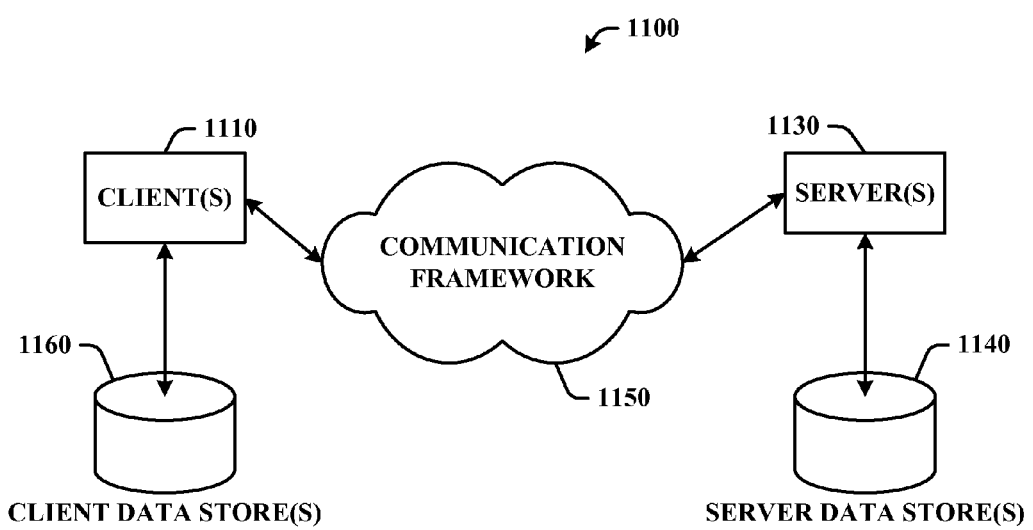
FIG. 11 is a schematic block diagram of a sample-computing environment.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

As used in this application, the terms "component," "system" and the like are intended to refer to a computer-related entity, either hardware, a combination of hardware and software, software or software in execution. For example, a component may be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Artificial intelligence based systems (e.g. explicitly and/or implicitly trained classifiers) can be employed in connection with performing inference and/or probabilistic determinations and/or statistical-based determinations as in accordance with one or more aspects of the subject innovation as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a system, method, apparatus, or article of manufacture using standard programming and/or engineering techniques to produce software, firmware, hardware or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

With reference to FIG. 10, an exemplary environment 1010 for implementing various aspects disclosed herein includes a computer 1012 (e.g., desktop, laptop, server, hand held, programmable consumer or industrial electronics . . . ). The computer 1012 includes a processing unit 1014, a system memory 1016, and a system bus 1018. The system bus 1018 couples system components including, but not limited to, the system memory 1016 to the processing unit 1014. The processing unit 1014 can be any of various available microprocessors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the present invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012 and to output information from computer 1012 to an output device 1040. Output adapter 1042 is provided to illustrate that there are some output devices 1040 like displays (e.g., flat panel and CRT), speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1016, it can also be external to computer 1012. The hardware/software necessary for connection to the network interface 1048 includes, for exemplary purposes only, internal and external technologies such as, modems including regular telephone grade modems, cable modems, power modems and DSL modems, ISDN adapters, and Ethernet cards or components.

FIG. 11 is a schematic block diagram of a sample-computing environment 1100 with which the subject innovation can interact. The system 1100 includes one or more client(s) 1110. The client(s) 1110 can be hardware and/or software (e.g., threads, processes, computing devices). The system 1100 also includes one or more server(s) 1130. Thus, system 1100 can correspond to a two-tier client server model or a multi-tier model (e.g., client, middle tier server, data server), amongst other models. The server(s) 1130 can also be hardware and/or software (e.g., threads, processes, computing devices). The servers 1130 can house threads to perform transformations by employing the subject innovation, for example. One possible communication between a client 1110 and a server 1130 may be in the form of a data packet transmitted between two or more computer processes.

The system 1100 includes a communication framework 1150 that can be employed to facilitate communications between the client(s) 1110 and the server(s) 1130. The client(s) 1110 are operatively connected to one or more client data store(s) 1160 that can be employed to store information local to the client(s) 1110. Similarly, the server(s) 1130 are operatively connected to one or more server data store(s) 1140 that can be employed to store information local to the servers 1130. By way of example and not limitation, the systems as described supra and variations thereon can be provided as a web service with respect to at least one server 1130. This web service server can also be communicatively coupled with a plurality of other servers 1130, as well as associated data stores 1140, such that it can function as a proxy for the client 1110.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A system that identifies and effectuates communication between a connectable client and a wireless human interface device, the wireless human interface device comprising:
    at least one wireless network communications port configured at least to transmit wireless communications over a wireless network;
    a client discovery component configured to identify the connectable client, issue a request to the connectable client via the network communications port to establish communication with the connectable client, and receive setup information from a human interface service executing on the connectable client, wherein the human interface service enables the wireless human interface device to connect to at least two connectable clients by making the wireless human interface device appear to each of the at least two connectable clients as a wireless node in the wireless network;
    an installation and association component configured to employ the setup information to determine whether and how to establish wireless communication with the connectable client and to install a driver on the wireless human interface device; and
    a diagnostic component that is configured to detect and diagnose aspects of the wireless human interface device, the aspects including battery life, association history, and current user of the human wireless interface device.

2. The system of claim 1, wherein the wireless human interface device further comprises:

a wireless setup component that is configured to broadcast information about the wireless human interface device.

3. The system of claim 2, wherein the broadcast information comprises a media access address and a device type of the wireless human interface device.

4. The system of claim 1, wherein the diagnostic component is also configured to detect and diagnose network attributes of disparate clients associated with a network.

5. The system of claim 1, wherein the wireless human interface device further comprises a LCD display and a biometric information retrieval component.

6. A system that identifies and effectuates communication between a connectable client and a wireless human interface device, the system comprising:
 at least one wireless network communications port;
 means for broadcasting information regarding the connectable client;
 means for disseminating information about the wireless human interface device;
 means for receiving, via the at least one wireless network communications port, information regarding the connectable client from a human interface service executing on the connectable client, wherein the human interface service enables the wireless human interface device to simultaneously control at least two connectable clients by making the wireless human interface device appear to each of the at least two connectable clients as a wireless node in a wireless network;
 means for accepting information about the wireless human interface device;
 means for delivering a driver and associated software to the wireless human interface device;
 means for configuring the wireless human interface device with the delivered driver and associated software; and
 means for diagnosing and detecting network and device information pertinent to an operation of the wireless human interface device, the connectable client, and a plurality of disparate devices connected to a network, the network and device information including battery life, association history, and current user of the wireless human interface device.

7. A computer-readable medium, not comprising a signal per se, encoded with a plurality of instructions that, when executed by a client computer, perform a method comprising:
 identifying a wireless human interface device external to the client computer and within a wireless communication vicinity of the client computer;
 providing setup information from a human interface service executing on the client computer to the wireless human interface device, wherein the human interface service enables the wireless human interface device to simultaneously control at least one other connectable client by making the wireless human interface device appear to the at least one other connectable client as a wireless node in a wireless network;
 receiving device information from the wireless human interface device;
 providing software to the wireless human interface device based, at least in part, on the received device information, wherein the software facilitates an establishment of wireless communication between the wireless human interface device and the connectable computer; and
 diagnosing aspects of the wireless human interface device, wherein the aspects that are diagnosed include battery life, association history, and current user of the client computer.

8. The computer-readable storage medium of claim 7, wherein the human interface service enables the wireless human interface device to connect to at least two connectable clients by providing the wireless human interface device with at least one driver and application software.

9. The computer-readable storage medium of claim 7, wherein the human interface service enables the wireless human interface device to control at least one application executing on the client computer.

10. The computer-readable storage medium of claim 7, wherein the method further comprises broadcasting information about the client computer.

11. The computer-readable storage medium of claim 10, wherein the information that is broadcast comprises a media access address and a device type of the client computer.

12. The computer-readable storage medium of claim 7, wherein the method further comprises diagnosing network attributes of disparate clients associated with a network.

13. The computer-readable medium of claim 7, wherein the human interface service enables the wireless human interface device to control a plurality of client computers connected in a trust relationship.

14. The computer-readable medium of claim 13, wherein the human interface service executes on each of a plurality of client computers, thereby enabling the wireless human interface device to simultaneously control at least two of the plurality of client computers.

15. The system of claim 1, wherein the human interface service enables the wireless human interface device to simultaneously control the at least two connectable clients.

16. The system of claim 1, wherein the wireless human interface device is a laptop in a conference room and the connectable client is a conference computer in a conference room.

* * * * *